US012639156B2

(12) United States Patent
Agrawal et al.

(10) Patent No.: US 12,639,156 B2
(45) Date of Patent: May 26, 2026

(54) SYSTEMS AND METHODS FOR ADAPTIVE ALLOCATION AND MANAGEMENT OF PROCESSING RESOURCES IN DATA CENTERS USING DYNAMIC ATTENTION-BASED GRAPH NEURAL NETWORKS

(71) Applicant: NVIDIA Corporation, Santa Clara, CA (US)

(72) Inventors: Vibhor Agrawal, Fremont, CA (US); Vadim Gechman, Hulda (IL)

(73) Assignee: NVIDIA Corporation, Santa Clara, CA (US)

(*) Notice: Subject to any disclaimer, the term of this patent is extended or adjusted under 35 U.S.C. 154(b) by 13 days.

(21) Appl. No.: 18/776,633

(22) Filed: Jul. 18, 2024

(65) Prior Publication Data

US 2026/0023642 A1 Jan. 22, 2026

(51) Int. Cl.
*G06F 11/07* (2006.01)

(52) U.S. Cl.
CPC ...... *G06F 11/0793* (2013.01); *G06F 11/0721* (2013.01)

(58) Field of Classification Search
CPC ... G06F 11/07; G06F 11/0793; G06F 11/0721
See application file for complete search history.

(56) References Cited

U.S. PATENT DOCUMENTS

| | | | | |
|---|---|---|---|---|
| 6,076,174 A * | 6/2000 | Freund | ................ | G06F 9/5072 |
| | | | | 709/225 |
| 9,742,652 B2 | 8/2017 | Gopisetty et al. | | |
| 11,544,457 B2 * | 1/2023 | Veyseh | ............... | G06N 3/0499 |
| 11,977,466 B1 * | 5/2024 | Gregorio-De Souza | .................. | |
| | | | | G06F 11/3409 |
| 11,977,993 B2 * | 5/2024 | Guzik | ...................... | G06N 7/01 |
| 2017/0286252 A1 | 10/2017 | Illikkal et al. | | |
| 2020/0104366 A1 * | 4/2020 | Xu | .......................... | G06N 3/084 |
| 2021/0319314 A1 * | 10/2021 | Perez | ...................... | G06N 3/088 |
| 2023/0124296 A1 * | 4/2023 | Ngo | ....................... | G06N 3/045 |
| | | | | 704/9 |
| 2023/0297453 A1 * | 9/2023 | Viclizki | ................ | G06N 3/045 |
| | | | | 714/47.2 |
| 2023/0409876 A1 * | 12/2023 | Agrawal | ............... | G06N 3/045 |
| 2024/0016049 A1 | 1/2024 | Shih et al. | | |
| 2024/0069998 A1 * | 2/2024 | Chatterjee | ............ | G06F 9/5027 |
| 2024/0406058 A1 * | 12/2024 | Alon | ...................... | H04L 43/06 |

* cited by examiner

*Primary Examiner* — Kamini B Patel

(74) *Attorney, Agent, or Firm* — Foley & Lardner LLP

(57) ABSTRACT

In various examples, systems, devices and methods are disclosed relating to management of processing resources and workloads assigned thereto. A system can obtain, from a plurality of processing resources executing a plurality of tasks, telemetry data and task assignment data. The system can perform generate, using the telemetry data and the task assignment data, a plurality of feature vectors, determine, using the plurality of feature vectors and a machine learning model employing a graph attention network (GAT) having a plurality of nodes, a performance state of a node of the plurality of nodes, and determine, based on the performance state of the node, an action to be taken to enhance performance of the plurality of processing resources or mitigate node failures. Each node can represent one or more respective processing resources and each feature vector can be associated with a respective node of the plurality of nodes.

20 Claims, 7 Drawing Sheets

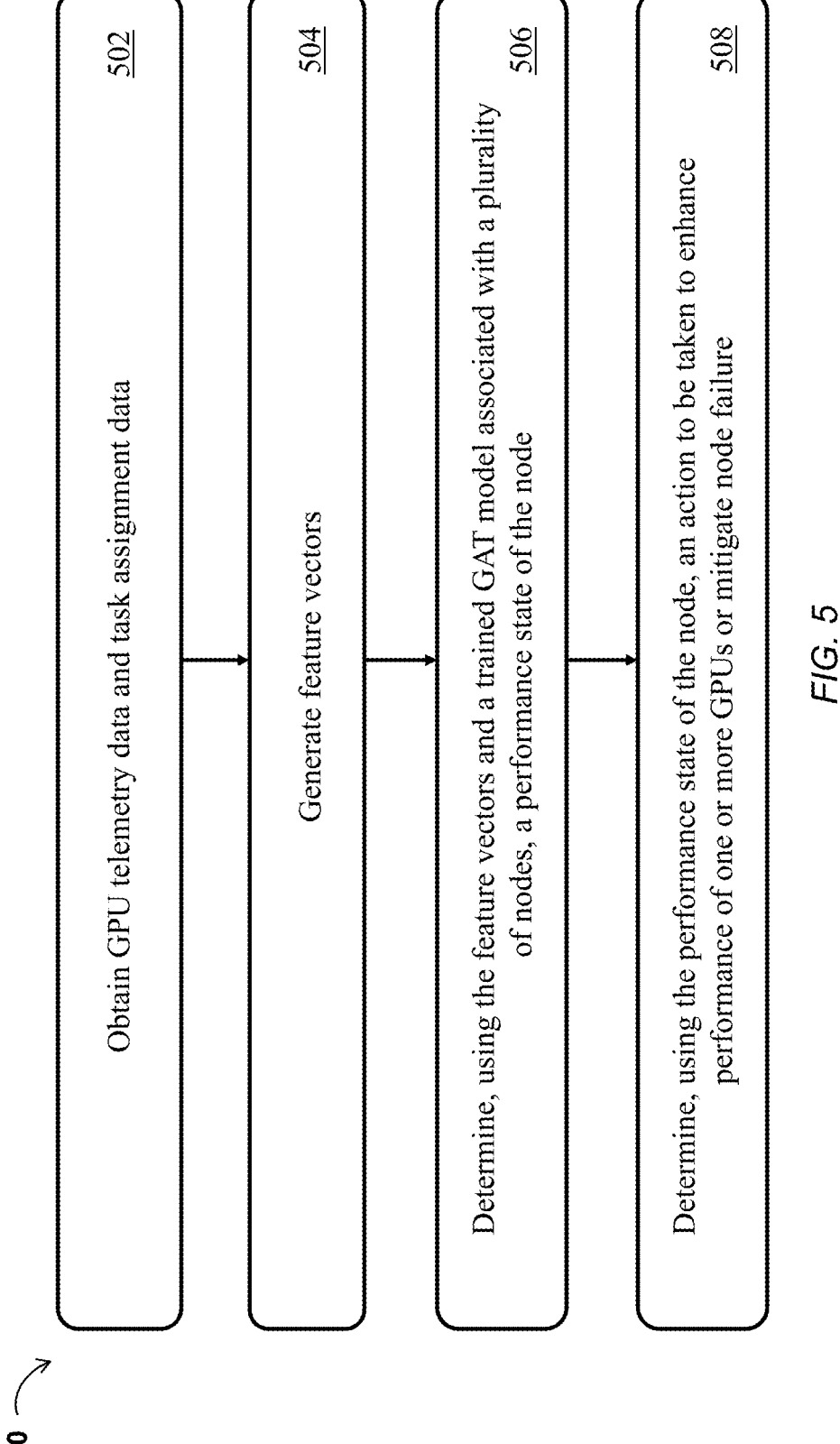

Obtain GPU telemetry data and task assignment data  <u>502</u>

Generate feature vectors  <u>504</u>

Determine, using the feature vectors and a trained GAT model associated with a plurality of nodes, a performance state of the node  <u>506</u>

Determine, using the performance state of the node, an action to be taken to enhance performance of one or more GPUs or mitigate node failure  <u>508</u>

SYSTEMS AND METHODS FOR ADAPTIVE ALLOCATION AND MANAGEMENT OF PROCESSING RESOURCES IN DATA CENTERS USING DYNAMIC ATTENTION-BASED GRAPH NEURAL NETWORKS

BACKGROUND

A data center can be viewed as a complex network of computing and storage resources, referred to herein as processing resources, that operate conjointly to deliver shared applications, data and/or services. The processing resources can include hardware resources such as computer servers, hardware processors, storage devices or equipment and/or network devices or equipment, among others. Other hardware components can include power systems or devices and cooling systems or devices. Another level of complexity of data center ecosystems relates to the complexity and number of tasks handled or processed at any time instance within a data center. For instance, big data analytics, artificial intelligence (AI) systems, mission-critical applications, time-sensitive applications or services, autonomous vehicle and/or advanced driver assistance system solutions, among other applications, services or solutions, involve simultaneous use of a plurality of processing resources.

The complexity of the architecture of a data center ecosystem in addition to the complexity, amount and dynamic nature of tasks handled by the data center ecosystem make the allocation and management of the processing resources in data centers technically challenging. Proper management and allocation of processing resources in data centers enables maximization or enhancement of hardware, network and application performance and leads to improved customer experience.

SUMMARY

Embodiments of the present disclosure relate to efficient and reliable management of processing resources in a data center ecosystem, or other types of computing ecosystems. Specifically, embodiments described in this disclosure relate to training and using machine learning models for adaptive allocation and management of processing resources within data center ecosystems and/or other types of ecosystems. The machine learning models leverage the data modeling and prediction capabilities of graph attention networks (GATs).

According to at least one aspect, a system can include a memory and one or more processing units to perform operations to obtain, from a plurality of graphics processing units (GPUs) executing a plurality of tasks, GPU telemetry data and task assignment data, where the task assignment data can be indicative, for each task, of one or more respective GPUs executing the task. The one or more processing units can perform operations to generate, using the telemetry data and the task assignment data, a plurality of feature vectors, determine, using the plurality of feature vectors and a machine learning model employing a graph attention network (GAT) having a plurality of nodes, a performance state of a node of the plurality of nodes, and determine, based on the performance state of the node, an action to be taken to enhance performance of the plurality of GPUs or mitigate node failures. Each node can represent one or more respective GPUs of the plurality of GPUs and each feature vector can be associated with a respective node of the plurality of nodes.

In some implementations, the GPU telemetry data can include real-time performance metrics of the plurality of GPUs.

In some implementations, the GPU telemetry data can include, for each GPU, performance metrics indicative of at least one of a temperature of the GPU, a temperature of a memory of the GPU, a GPU power usage, a GPU power usage, a GPU memory usage, or a speed of a fan of the GPU.

In some implementations, the task assignment data can include, for each task, at least one of a task duration, a task duration or resource requirements.

In some implementations, to generate the plurality of feature vectors, the one or more processing units perform operations to determine at least one of statistical features of the telemetry data over a time window, temporal features of the telemetry data, or frequency-domain features of the telemetry data.

In some implementations, the one or more processing units can perform operations to predict a future failure of the node based on the performance state of the node and determine the action to be taken based on the predicted future failure of the node.

In some implementations, the one or more processing units can perform operations to determine, based on the performance state of the node, one or more nodes to which to assign a new task.

In some implementations, the one or more processing units can perform operations to determine, based on the performance state of the node, to transfer a workload of the node to another node of the plurality of nodes.

In some implementations, the one or more processing units can perform operations to determine, based on the performance state of the node, a scheduling of maintenance activities for at least one GPU of the node.

In some implementations, the one or more processing units can perform operations to determine, based on the performance state of the node, a load balancing approach for distributing workloads among the plurality of nodes.

In some implementations, the one or more processing units can perform operations to determine, based on the performance state of the node, to adjust a parameter of a cooling system associated with the node.

In some implementations, the one or more processing units can perform operations to determine, based on the performance state of the node, to adjust a parameter of a power system associated with the node.

In some implementations, the one or more processing units can perform operations to determine one or more failure patterns based on predicted failures of one or more nodes, and determine, based on the one or more failure patterns, a design of a redundant system configured to take over workload from failing nodes.

In some implementations, the machine learning model can be implemented over one or more other GPUs different from the plurality of GPUs.

In some implementations, the system can include at least one of a system for performing simulation operations, a system for performing simulation operations to test or validate autonomous machine applications, a system for performing digital twin operations, a system for performing light transport simulation, a system for rendering graphical output, a system for performing deep learning operations, a system implemented using an edge device, a system for generating or presenting virtual reality (VR) content, a system for generating or presenting augmented reality (AR) content, a system for generating or presenting mixed reality (MR) content, a system incorporating one or more Virtual Machines (VMs), a system implemented at least partially in a data center, a system for performing hardware testing using simulation, a system for synthetic data generation, a system for performing generative AI operations, a system for performing one or more operations using a large language model (LLM), a system for performing one or more operations using a vision language model (VLM), a collaborative content creation platform for 3D assets, or a system implemented at least partially using cloud computing resources.

According to another aspect, a method can include obtaining, from a plurality of graphics processing units (GPUs) executing a plurality of tasks, GPU telemetry data and task assignment data, where the task assignment data can be indicative, for each task, one or more respective GPUs executing the task; generating, using the performance metrics and the task assignment data, a plurality of feature vectors; determining, using the plurality of feature vectors and a machine learning model employing a graph attention network (GAT) having a plurality of nodes, a performance state of a node of the plurality of nodes; and determining, based on the performance state of the node, an action to be taken to enhance performance of the plurality of GPUs or mitigate node failures. Each node can represent one or more respective GPUs of the plurality of GPUs and each feature vector can be associated with a respective node of the plurality of nodes.

In some implementations, the GPU telemetry data can include real-time performance metrics of the plurality of GPUs.

In some implementations, the GPU telemetry data can include, for one or more (e.g., each) GPU, performance metrics indicative of at least one of a temperature of the GPU, a temperature of a memory of the GPU, a GPU power usage, a GPU power usage, a GPU memory usage, or a speed of a fan of the GPU.

In some implementations, the task assignment data can include, for each task, at least one of a task duration, a task duration or resource requirements.

In some implementations, generating the plurality of feature vectors can include determining at least one of statistical features of the telemetry data over a time window, temporal features of the telemetry data, or frequency-domain features of the telemetry data.

In some implementations, the method can include predicting a future failure of the node based on the performance state of the node, and determining the action to be taken based on the predicted future failure of the node.

In some implementations, the method can include determining, based on the performance state of the node, one or more nodes to which to assign a new task.

In some implementations, the method can include determining, based on the performance state of the node, to transfer a workload of the node to another node of the plurality of nodes.

In some implementations, the method can include determining, based on the performance state of the node, a scheduling of maintenance activities for at least one GPU of the node.

In some implementations, the method can include determining, based on the performance state of the node, a load balancing approach for distributing workloads among the plurality of nodes.

In some implementations, the method can include determining, based on the performance state of the node, to adjust a parameter of a cooling system associated with the node.

In some implementations, the method can include determining, based on the performance state of the node, to adjust a parameter of a power system associated with the node.

In some implementations, the method can include determining one or more failure patterns based on predicted failures of one or more nodes, and determining, based on the one or more failure patterns, a design of a redundant system configured to take over workload from failing nodes.

In some implementations, the machine learning model can be implemented over one or more other GPUs different from the plurality of GPUs.

According to yet another aspect, a non-transitory computer readable medium can include computer code instructions stored thereon. The computer code instructions when executed by one or more processors can cause the one or more processors to obtain, from a plurality of graphics processing units (GPUs) executing a plurality of tasks, GPU telemetry data and task assignment data, where the task assignment data can be indicative, for each task, of one or more respective GPUs executing the task. The computer code instructions when executed by one or more processors can cause the one or more processors to generate, using the telemetry data and the task assignment data, a plurality of feature vectors, determine, using the plurality of feature vectors and a machine learning model employing a graph attention network (GAT) having a plurality of nodes, a performance state of a node of the plurality of nodes, and determine, based on the performance state of the node, an action to be taken to enhance performance of the plurality of GPUs or mitigate node failures. At least one (e.g., each) node can represent one or more respective GPUs of the plurality of GPUs and each feature vector can be associated with a respective node of the plurality of nodes.

According to yet another aspect, an application programming interface (API), which can be used to interface with an application executed using one or more processors, can cause the one or more processors to obtain, from a plurality of graphics processing units (GPUs) executing a plurality of tasks, GPU telemetry data and task assignment data, where the task assignment data can be indicative, for each task, of one or more respective GPUs executing the task. The API can cause the one or more processors to generate, using the telemetry data and the task assignment data, a plurality of feature vectors, determine, using the plurality of feature vectors and a machine learning model employing a graph attention network (GAT) having a plurality of nodes, a performance state of a node of the plurality of nodes, and determine, based on the performance state of the node, an action to be taken to enhance performance of the plurality of GPUs or mitigate node failures. Each node can represent one or more respective GPUs of the plurality of GPUs and each feature vector can be associated with a respective node of the plurality of nodes.

BRIEF DESCRIPTION OF THE DRAWINGS

The present systems and methods for efficient error resilience in multimedia communication systems are described in detail below with reference to the attached drawing figures, wherein:

FIG. 5 shows a flowchart of a method for managing a fleet of GPUs and/or processing resources, in accordance with some embodiments of the present disclosure;

DETAILED DESCRIPTION

Figure 1:
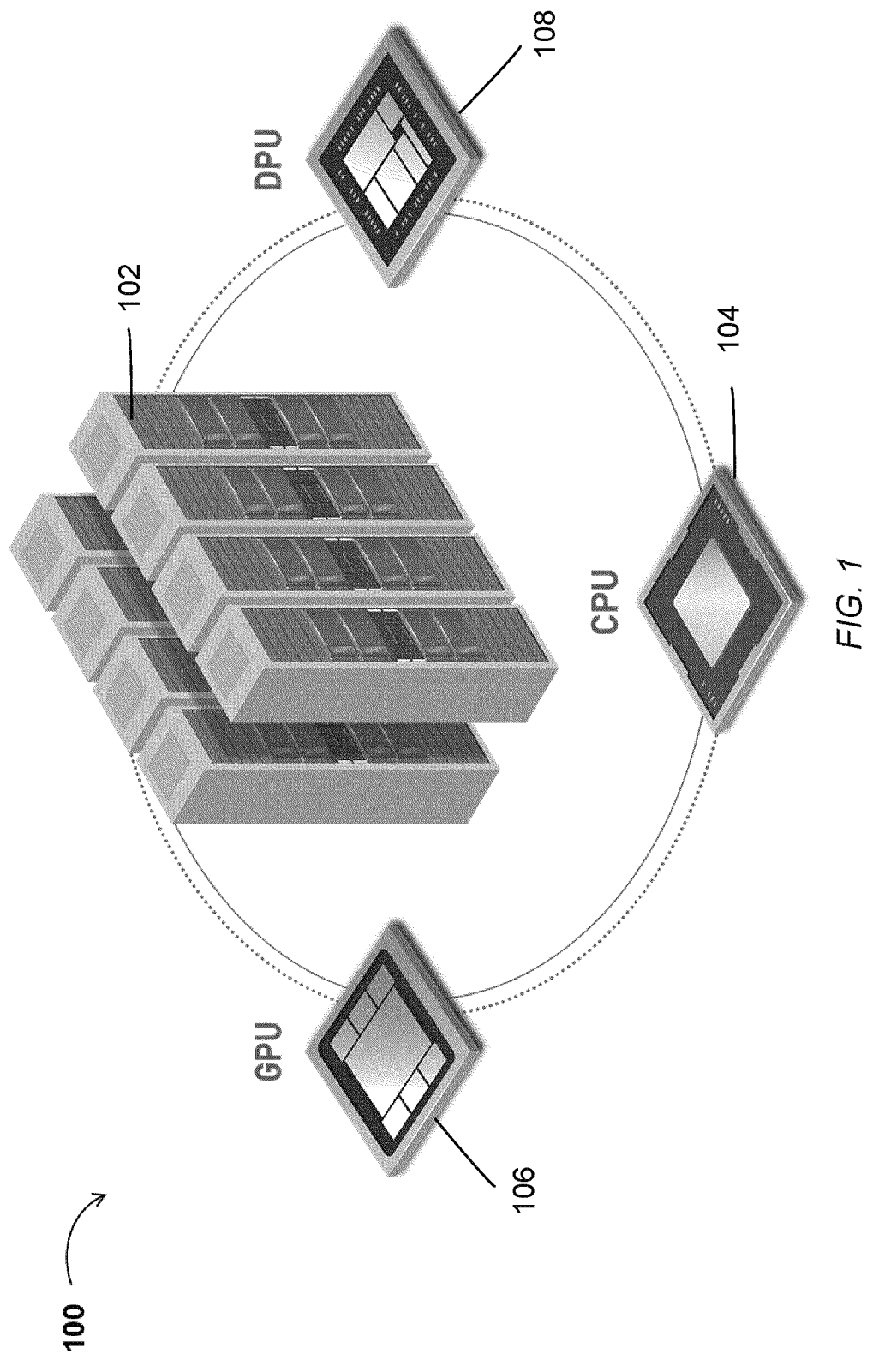
FIG. 1 depicts a diagrammatic overview of a data center, in accordance with some embodiments of the current disclosure.

This disclosure relates to systems and methods for enhancing management of processing resources, such as graphics processing units (GPUs), within data center ecosystems. Specifically, embodiments described in this disclosure relate to training and using machine learning models for adaptive allocation and management of GPUs within data center ecosystems. The machine learning models leverage the data modeling and prediction capabilities of graph attention networks (GATs). While embodiments described herein focus mainly on management and allocation of GPUs, the systems and methods described herein can be employed for dynamically managing and allocating other types of processing resources.

GPUs are used in data centers to accelerate high performance computing and hyperscale workloads. Some GPUs can enable parsing of petabytes of data faster, e.g., orders of magnitude faster, than traditional CPUs. In applications ranging from artificial intelligence, deep learning, driver assistance systems, autonomous vehicles, large scale simulations, graphical simulations and/or energy exploration, among other applications, GPUs, due to their exceptional ability to perform parallel data processing, can significantly accelerate large-scale data processing and high-performance computing. However, the use of GPUs in data centers comes with additional technical challenges, e.g., with respect to power consumption and/or designing the data center.

A data center can include thousands of GPUs that can be running simultaneously performing a plurality of tasks. Also, separate GPUs can be working in collaboration in executing a common task. In other words, a single task can be performed by or assigned to a plurality of GPUs. The large number of GPUs typically deployed in a data center as well as the interdependencies between the GPUs (e.g., due to sharing tasks) present a complex system or network of GPUs to manage. Given the interdependencies between GPUs, a GPU overload or a GPU failure can affect other GPUs leading to spread underperformance. In the current disclosures, an innovative approach to enhance the management of GPUs within data center ecosystems leverages the sophisticated data modeling and prediction capabilities of graph attention networks (GATs).

A graph neural network (GNN) based framework for GPU management enables comprehensive capturing and understanding of the intricate dependencies and heterogeneity in workloads, processing requirements, and GPU usage patterns within the data center environment. A graph attention network (GAT) model can incorporate attention mechanisms to the GNN, allowing it to weigh the importance of neighboring nodes in the graph differently. In a GAT-based GPU management system, a GAT can be trained to discern the inherent patterns in resource usage, thereby predicting future GPU reliability with greater precision and adaptability. The attention mechanisms enable the GAT-based GPU management system to dynamically adjust to real-time data, offering a more robust and flexible predictive model.

In particular, by using a graph-based representation with attention features, the GAT-based GPU management system can accurately model the complex network of interactions between different tasks, their resource dependencies, and the availability of GPUs, which in turn enables better workload distribution, proactive resource allocation, and reasonable power management, leading to optimal utilization of the data center resources. Furthermore, the ability of a GAT to manage non-Euclidean data and multiple types of relationships simultaneously makes it exceptionally well-suited for handling the irregularities often seen in GPU utilization data. The GAT can learn both temporal and spatial correlations from the GPU usage data, adapting to changes in workload patterns and therefore improving the robustness and reliability of data center operations.

Overall, embodiments described herein drive significant improvements in the operational efficiency of data centers, leading to substantial reductions in operational costs and an improvement in the quality of service the data center provides. Specifically, using a GAT in real-time data center operations allows for significantly better resource allocation. A GAT-based machine learning model can make more informed decisions by analyzing the relationships between various nodes and systems, and optimize for efficiency and cost-effectiveness. Furthermore, while traditional methods often need to pay more attention to complex interdependencies between systems, leading to delayed or incorrect fault detection, the GAT-based machine learning model recognizes these intricate relationships, enabling quicker and more accurate fault identification and thereby reducing downtime. In addition, the GAT-based machine learning model can be designed to quickly scale with the growing size and complexity of data center infrastructures. This means that the GAT-based GPU management solution(s) described herein can offer optimized performance without requiring frequent model retraining even as the size of the data center, e.g., in terms of the total number of GPUs, increases or evolves.

Also, by making more intelligent decisions on resource allocation and operational adjustments, the GAT-based model helps to significantly reduce the energy consumption of data center operations leading to cost-effectiveness and contributing to sustainability goals, which is an increasingly important concern for operators of data centers. Another advantage of the GAT-based model is the ability to be integrated with existing data center management systems seamlessly, which means that data center operators do not have to overhaul their existing setups, making the transition cost-effective and minimally disruptive. Finally, the GAT-based model described herein can operate in real-time, allowing immediate action based on the most current data. This real-time capability ensures that decision-making is as timely as possible, thereby increasing operational efficiency.

According to at least one aspect, a GPU management system can include one or more processing units that perform operations to obtain, from a plurality of graphics processing units (GPUs) executing a plurality of tasks, GPU telemetry data and task assignment data, and generate, using the performance metrics and the task assignment data, a plurality of feature vectors. The task assignment data can be indicative, for at least one (e.g., each) task, of one or more respective GPUs executing the at least one task. The one or more processing units can determine, using the plurality of feature vectors and a machine learning model employing a graph attention network (GAT) having a plurality of nodes, a performance state of a node of the plurality of nodes. At least one (e.g., each) node can represent one or more respective GPUs of the plurality of GPUs and at least one (e.g., each) feature vector can be associated with a respective node of the plurality of nodes. The one or more processing units can determine, based on the performance state of the node, an action to be taken to enhance performance of the plurality of GPUs or mitigate node failures.

It should be understood that arrangements described herein, e.g., in relation with the figures, are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

With reference to FIG. 1, a diagrammatic view of a data center 100 is shown, in accordance with some embodiments of the current disclosure. In brief overview, the data center 100 can include a plurality of computer servers 102 configured to perform various operations, such as running or executing applications, managing data storage and data access, managing internal and/or external communications or a combination thereof, among others. The computer servers 102 can be communicatively coupled to one another. The computer servers 102 can be configured to operate in collaborative manner. Besides the computer servers 102, the data center 100 can include other hardware components such as networking equipment, e.g., routers, switches, network interface cards, etc., firewalls, power equipment and/or cooling systems, among others.

The data center 100 or the computer servers 102 can include various hardware processing components, such as central processing units (CPUs) 104, GPUs 106 and/or data processing units (DPUs) 108. The data center 100 or the computer servers 102 may include hardware processors of other types, such as digital signal processors (DSPs), media processors, microcontroller, vector processors, array processors, application-specific integrated circuits (ASICs) and/or field programmable gate arrays (FPGAs) among others. Any of the processors or processing units of the data center 100 can be a single-core processor or a multi-core processor. The data center 100 or the computer servers 102 can include software or virtual processing resources, such as virtual machines (VMs) and/or micro VMs. While embodiments described herein focus on the management and allocation of GPUs 104, in general, the systems and methods described herein can be employed for managing any combination of processing resources associated with data center ecosystems or other ecosystems.

The CPUs 104, GPUs 106, DPUs 108 and/or any other processors or processing resources can be communicatively coupled to one another or may configure to operate conjointly. For instance, multiple GPUs 106 or more generally multiple processors can simultaneously execute operations associated with a common task, application or service. Also, a single GPU 106 or more generally a single processor can simultaneously run or execute operations or software instructions associated with different tasks, applications or services. The distribution of operations associated with a single task, application or service among multiple processors, e.g., any combination of CPUs 104, GPUs 106 or DPUs 108, as well as the allocation of operations associated different tasks, applications or services to a single processor, e.g., CPU 104, GPU 106 or DPU 108, results in intricate dependencies between workloads as well as dependencies between the states, e.g., performance states of different processors. Furthermore, such workload allocation leads to dynamic processing requirements as well as complex and varying resource usage patterns, e.g., GPU usage patterns, within the data center environment. The workloads can vary over time for any single processor and can vary among separate processors at any time instance. The intricate dependencies between workloads and/or processing resources, the heterogeneity, and the dynamic nature of workloads as well as the large scale of processing resources and tasks handled by the processing resources make it very challenging to discern the inherent patterns in resource usage and predict or monitor resource reliability with adequate precision and adaptability.

Embodiments described herein leverage the sophisticated data modeling and prediction capabilities of GATs to enhance management of processing resources, e.g., CPUs 104, GPUs 106, DPUs 108, other processors or any combination thereof, within data center ecosystems or other ecosystems. In particular, attention mechanisms of GATs are used to weigh the importance of neighboring nodes in a graph or network of processing resources, which enables dynamic adjustment to real-time data and leads to a more robust and flexible model for monitoring and/or predicting health or performance states of processing resources.

Figure 2:
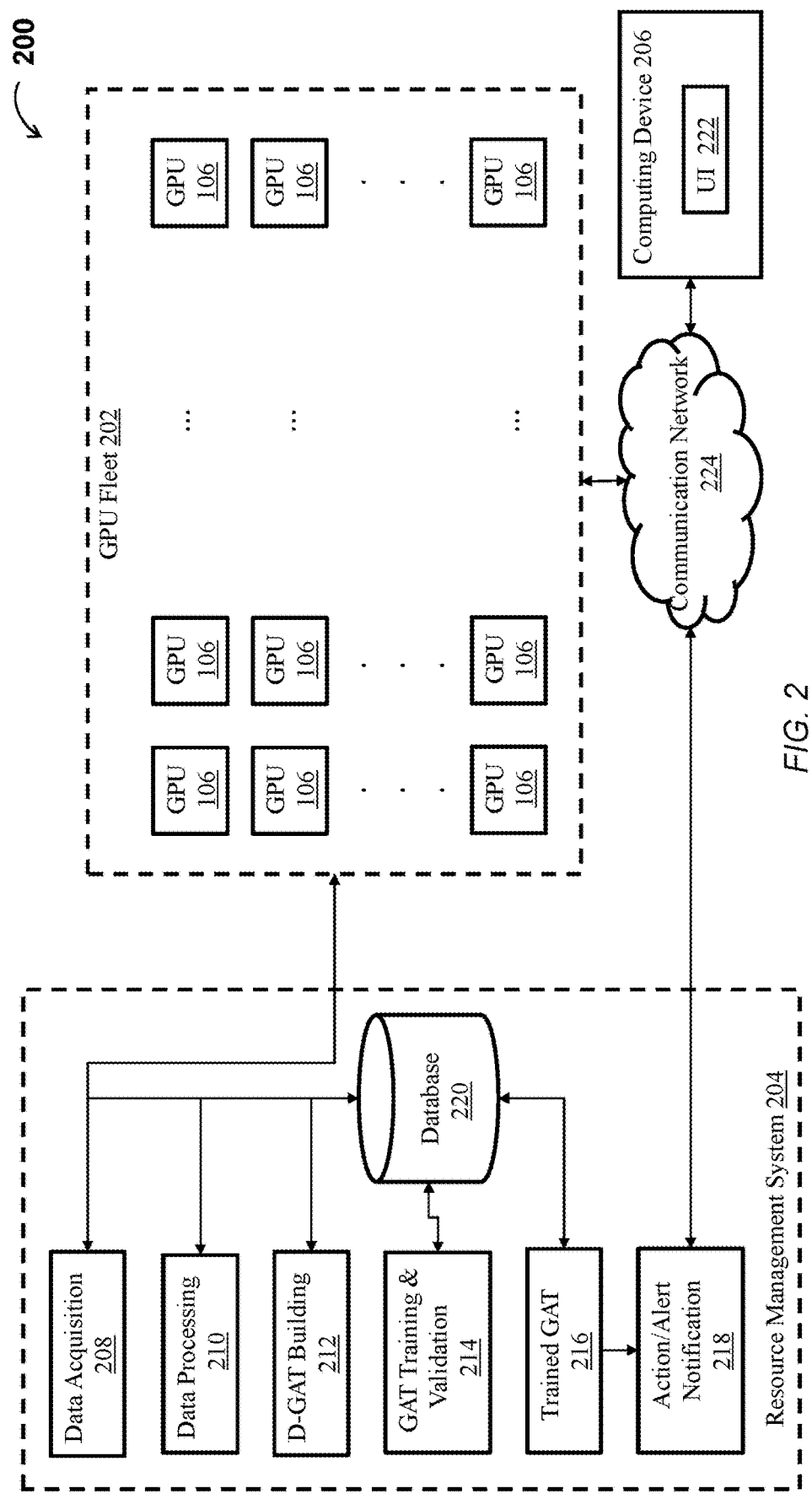
FIG. 2 shows a block diagram of a computer environment for managing a fleet of processing resources, in accordance with some embodiments of the current disclosure.

Referring now to FIG. 2, a block diagram of a computer environment 200 for managing a fleet of processing resources is shown, in accordance with some embodiments of the current disclosure. In brief overview, the computer environment 200 can include a GPU fleet 202, a resource management system 204 and one or more computing devices communicatively coupled to the resource management system 204. The computer environment 200 can include a data center such as the data center 100 of FIG. 1 or portion thereof. The GPU fleet 202 can include a plurality of GPUs 106. The GPUs 106 can be interconnected. The resource management system 204 can manage the GPUs 106 and allocate tasks or workload thereto. While FIG. 2 depicts a fleet 202 of GPUs 106, in general the fleet 202 can be a fleet of processing resources managed by the resource management system 204.

The resource management system 204 can include a data acquisition subsystem 208, a data processing subsystem 210, a digital GAT (D-GAT) building subsystem 212, a GAT training and validation subsystem 214, a trained GAT 216 and an action (or alert notification) subsystem 218. The resource management system 204 can include a database 220 to store data associated with the resource management system 204. The resource management system 204 and/or any subsystem thereof, e.g., subsystems 208-218, can be implemented as hardware, firmware, software or a combination thereof. For instance, the resource management system 204 and the subsystems 208-218 can be implemented as executable instructions running on or executed by processing resources of the computer environment 200. For instances, the resource management system 204 and the subsystems 208-218 can be implemented as software instructions executing or running on one or more GPUs 106 of the data center 100 that are different from the GPUs 106 in the fleet 202. The subsystems 208-218 and the database 220 are described in further detail below.

The resource management system 204 can be configured to generate and train a GAT to monitor and/or predict performance states or health states of processing resources, e.g., GPUs 106, of the fleet 202 in real time or near real-time. A GAT can be viewed as neural network architecture configured to operate on graph-structured data. The graph-structured data can represent an attention-augmented graph indicative of a network of processing resources, e.g., GPUs 106, of the fleet 202. Examples of the graph-structured data or attention-augmented graphs are discussed in further detail below in relation with FIG. 3. An example of the GAT or the neural network architecture is described below in relation with FIG. 4. The resource management system 204 can train the GAT using data acquired from the processing resources, e.g., GPUs 106, of the fleet 202. The trained GAT 216 can be configured to predict future states of the GPUs 106 and/or other processing resources of the fleet 202 and determine actions to be taken in real-time or near real-time.

In some implementations, the resource management system 204 can include at least one of a system for performing simulation operations, a system for performing simulation operations to test or validate autonomous machine applications, a system for performing digital twin operations, a system for performing light transport simulation, a system for rendering graphical output, a system for performing deep learning operations, a system implemented using an edge device, a system for generating or presenting virtual reality (VR) content, a system for generating or presenting augmented reality (AR) content, a system for generating or presenting mixed reality (MR) content, a system incorporating one or more Virtual Machines (VMs), a system implemented at least partially in a data center, a system for performing hardware testing using simulation, a system for synthetic data generation, a system for performing generative AI operations, a system for performing one or more operations using a large language model (LLM), a system for performing one or more operations using a vision language model (VLM), a collaborative content creation platform for 3D assets, or a system implemented at least partially using cloud computing resources.

The resource management system 204 can deploy or use the trained GAT 216 to predict health states or performance states of the GPUs 106 and/or other processing resources of the fleet 202 and determine one or more actions to be taken in relation with management of the processing resources of the fleet 202 and workloads assigned thereto. For instance, the resource management system 204 can acquire real-time or near real-time data from the GPUs and use the acquired data to generate input data to the trained GAT 216. The trained GAT 216 can provide predicted health or performance states of the GPUs 106 and/or other processing resources of the fleet as output. In some implementations, the trained GAT 216 may output action(s) to be taken in relation to one or more GPUs 106 and/or tasks assigned thereto. In some implementations, the resource management system 204 can determine the action(s) to be taken in relation to the one or more GPUs 106 and/or tasks assigned thereto based on the health or performance states of the GPUs 106 of the fleet 202 provided by the trained GAT 216. The resource management system 204 can provide indications of the states of the GPUs 106 and/or other processing resources of the fleet 202 to the computing device 206. The resource management system 204 can provide indications of the action(s) to be taken to the computing device 206.

The computing device 206 can include a computer server 102, such as a web server or a load balancing server, among others. The computing device 206 can include a client device, such as a desktop, a laptop, a smart TV, a smart phone, a handheld device or a combination thereof, among others. The computing device 206 can include or can be communicatively coupled to a display device to display information received from the resource management system 204. The computing device 206 can display information received from the resource management system 204 via a user interface (UI) 222, e.g., a graphical user interface (GUI). In some implementations, the resource management system 204 can provide the UI 222 to the computing device 206.

Figure 3:
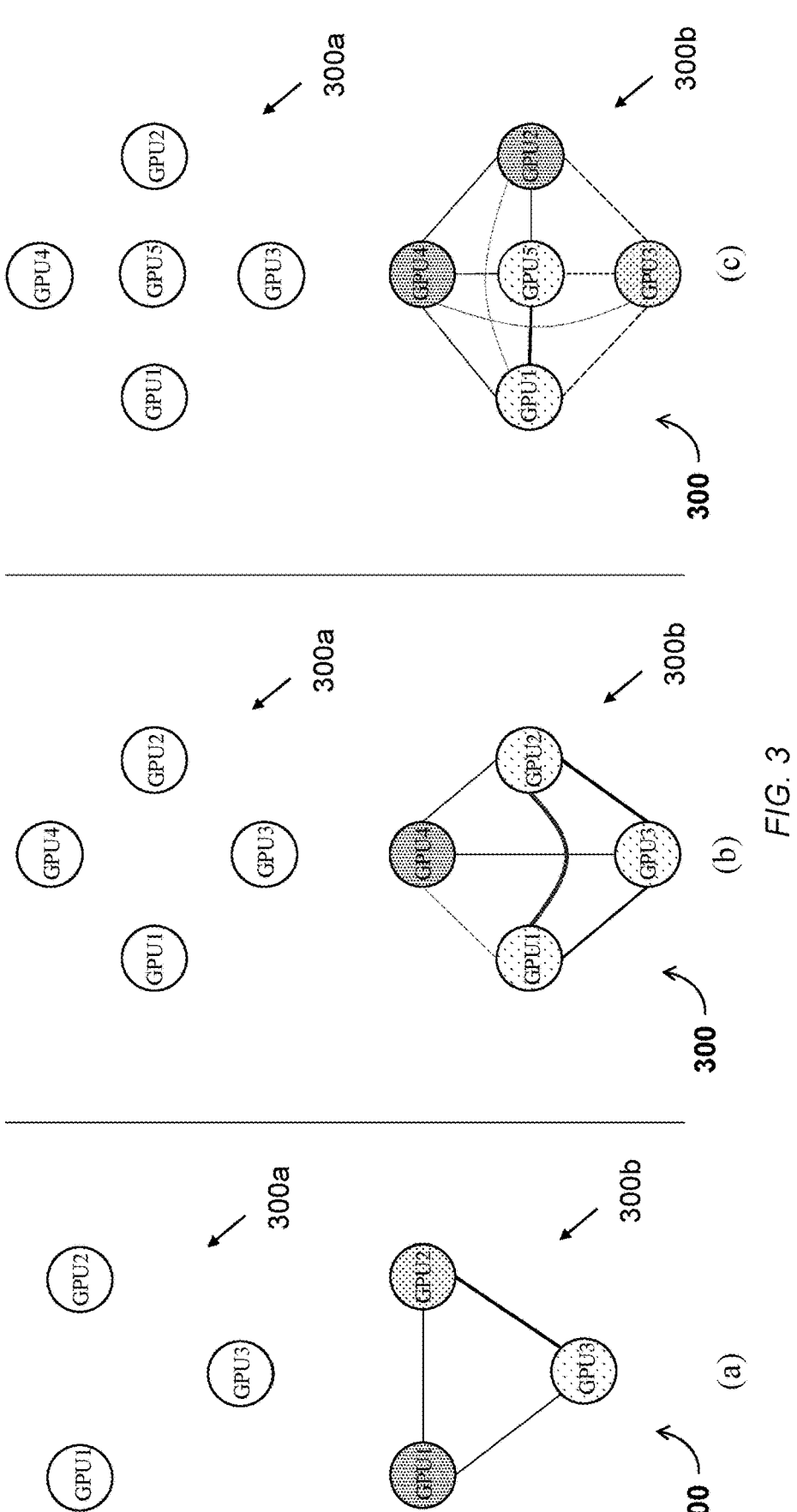
FIG. 3 shows a scenario of augmenting a graph representing a plurality of GPUs with attention data, in accordance with some embodiments of the current disclosure.

Referring now to FIG. 3, a scenario of augmenting a graph 300 representing a plurality of GPUs 106 with attention data is depicted, in accordance with some embodiments of the current disclosure. Each node of the graph represents a corresponding GPU 106. In general, each node of the graph 300 can represent a corresponding processing resource or a corresponding cluster of processing resources. At each step of the steps (a) to (c), the top graph 300a represents the GPUs 106 without any attention information. Before any tasks are assigned, the attention mechanism can be assumed to have no particular preferences or weights for neighboring nodes as there are no active collaborations between the GPUs 106. In the top graph 300a, the attention weights can be initialized to be zero (e.g., no links between the nodes) or some other constant value because there are no tasks assigned to the GPUs to influence the allocation of the attention weights.

At step (a), a first task is assigned is assigned to GPU1, GPU 2 and GPU 3. In response, the GAT can dynamically adjust or update the attention weights between GPU1, GPU2 and GPU3 to focus on the subgraph including GPU1, GPU 2 and GPU 3. The adjusted attention weights mean that the GAT model "pays more attention" to the interactions and data flow between these three GPUs compared to others. The edges connecting GPU1, GPU2 and GPU3 in graph 300b of step (a) represent relatively higher attention weights indicating a current active collaboration between GPU1, GPU2 and GPU3 on the first assigned task. As such, the attention augmented graph 300b of step (a) reflects that the task-related communications and/or dependencies between these GPUs are crucial for understanding or determining their current states, potentially influencing their performance or identifying bottlenecks.

At step (b) of FIG. 3, a second task is assigned expanding the collaboration to include a fourth GPU (GPU 4) alongside the GPUs GPU1, GPU2 and GPU3. The second task can be assigned while the first task is still being handled or after the first task is complete. With the assignment of the second task and the inclusion of GPU 4, the GAT model can recalibrate the attention weights to incorporate the new GPU-task relationships. Attention weights between GPU4 and the GPUs GPU1, GPU2 and GPU3, reflecting the expanded collaboration. As depicted in graph 300b of step (b), higher attention weights are depicted by the edges connecting GPU4 to the GPUs GPU1, GPU2 and GPU3, which adjusts the graph's focus to accommodate the updated task dynamics. Incorporating the additional GPU GPU4 alters the computational landscape, calling for a reassessment of how information and workload are shared among the involved processing units. The shift in focus of the GAT model ensures it captures the most relevant interactions under the new task structure.

At step(s) of FIG. 3, another task is assigned further expanding the active collaboration to include five GPUs, GPU1, GPU2, GPU3, GPU4 and GPU5. The attention mechanism undergoes another adjustment to account for the involvement of all five GPUs. The GAT model broadens its focus, increasing attention weights across a wider array of edges that now include connections to and from the newly involved GPU (GPU 5). This comprehensive update ensures that the model accurately reflects the full spectrum of active GPU collaborations. The GAT model's ability to adaptively recalibrate attention weights in response to changing task allocations and GPU collaborations leads to accurate representation of the current states of the GPUs 106 (or more generally, of processing resources). The GAT model can provide insights into potential performance issues, resource bottlenecks, or failure risks by focusing on the most pertinent interactions among the GPUs 106.

In FIG. 3, the type and thickness of the links between the GPUs 106 reflect the attention weights between the GPUs 106. For instance, links shown with continuous lines represent higher attention weights compared to links depicted as dashed lines. Furthermore, the thickness of the link can be indicative of the value of the corresponding attention weight, e.g., the thicker the link the larger is the corresponding attention weight. Also, the size, color or pattern of each node can be indicative of the corresponding state of the node. For instance, in FIG. 3, the darkness of the node pattern represents the greater likelihood that the corresponding GPU 106 can fail. The node patterns in FIG. 3 can be indicative, from dark to lighter, of the GPU states of "high likelihood of failure," "moderate likelihood of failure" and "less likely to fail."

As depicted in the scenarios of steps (a) to (c) of FIG. 3, the dynamic adjustment of attention weights allows the GAT model to maintain a focused, accurate and relevant understanding of the current, real-time or near real-time operational states of GPUs 106. The operation states of a processing resource can be referred to herein as a state, performance state or health state of the processing resource. Given the dynamic nature of the workloads assigned to or handled by the GPUs 106 or the processing resources of fleet 202, the adaptability of the GAT model enables performance optimization and failure prediction of the GPUs 106 as well as more reliable workload distribution, ensuring that computational resources are allocated efficiently and effectively in response to evolving demands and collaborations.

Figure 4:
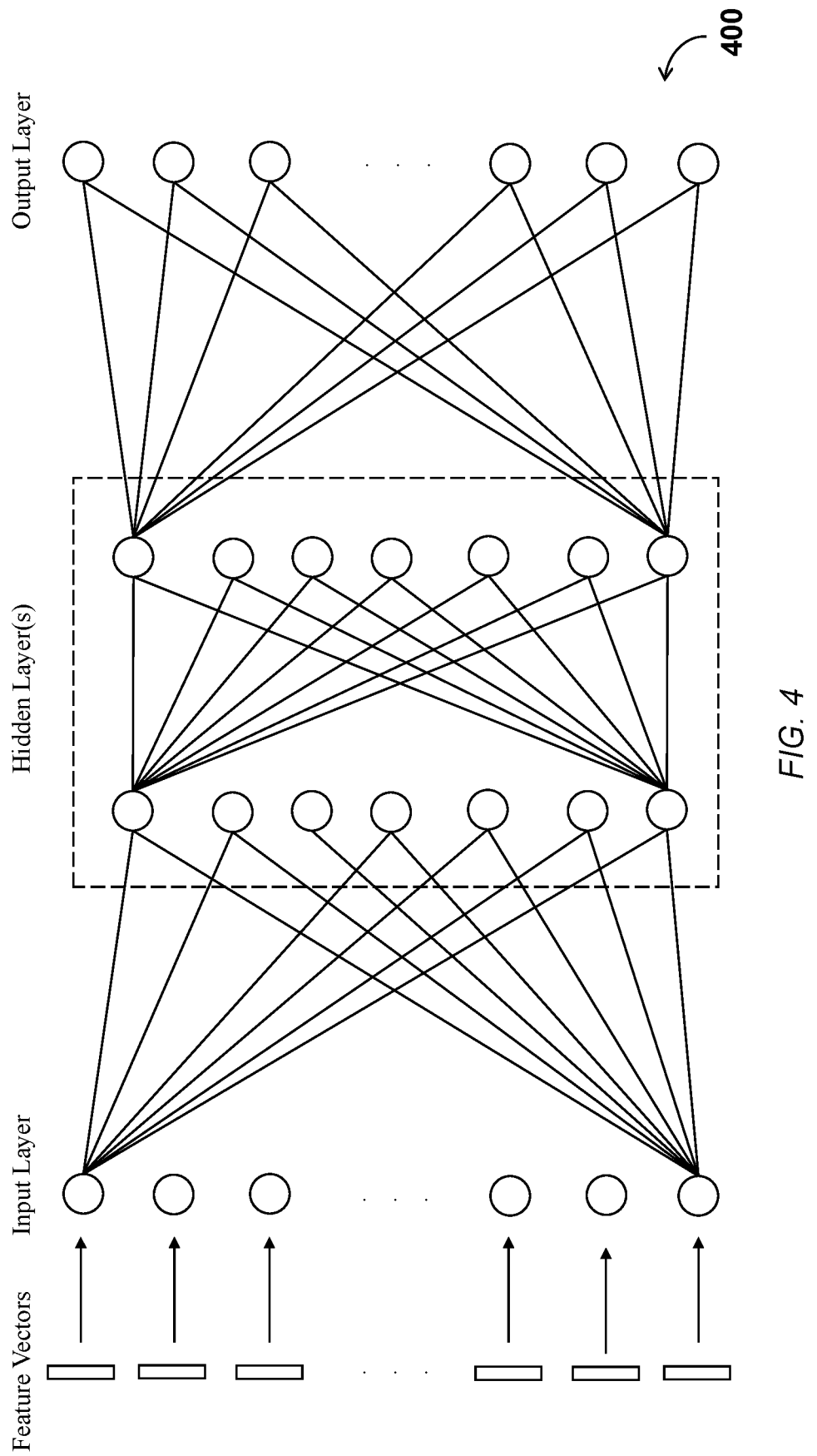
FIG. 4 shows a GAT or graph neural network (GNN) architecture, in accordance with some embodiments of the present disclosure.

Referring now to FIG. 4, a GAT or graph neural network (GNN) architecture 400 is shown, in accordance with some embodiments of the current disclosure. The GNN 400 can include an input layer, one or more hidden layers and an output layer. The GNN 400 can receive feature vectors of the GPUs 106, or more generally of processing resources, of the fleet 202 as input. For instance, the input layer can include a plurality of nodes or artificial neurons. In some implementations, each node or neuron of the GNN can receive a feature vector of a corresponding GPU 106 or processing resource as input. The GNN 400 can be configured to provide or generate states of the GPUs 106 as output. For instance, the output layer can include a plurality of nodes or artificial neurons where each node or neuron can provide or generate the current state of a corresponding GPU 106. The hidden layer(s) can be configured to perform processing between the input layer and the output layer as discussed in further detail below.

Referring back to FIG. 2, the data acquisition subsystem 208 can collect or acquire data from the GPUs 106 and/or any other processing resources of the fleet 202. The data acquisition subsystem 208 can acquire or collect telemetry data of processing resources, e.g., GPUs 106, and task assignment data for training and validation of the GAT model. The data acquisition subsystem 208 can acquire or collect the telemetry data and the task assignment data during deployment of the GAT model. The telemetry data for each GPU 106 or processing resource of the fleet 202 can include parameters or parameter values indicative of the corresponding temperature, corresponding memory temperature, corresponding power usage, corresponding core utilization, corresponding memory usage and/or corresponding fan speed among other parameters. The telemetry data may include parameters related to encoder and/or decoder utilization, processing unit affinity, clocks of the processing unit, processing unit virtualization, operating system information and/or other attributes or features of the processing unit. In general, the telemetry data can include data indicative of operational parameters, features and/or attributes of each processing resource of the fleet 202.

The task assignment data can include parameters or parameter values indicative of task name, name of the process or application initiating the task, task duration or expected task duration, resource requirements and/or task dependencies among others. The task assignment data can include indications of the GPUs 106 or processing resources to which each task is assigned. For at least on (e.g., each) task, the task assignment data can include indications of respective sub-tasks and the GPU(s) 106 or processing resource(s) to which the at least (e.g., each) sub-task is assigned. For one or more (e.g., each) sub-task, the task assignment data can include parameters or parameter values indicative of sub-task duration or expected sub-task duration, resource requirements for the sub-task and/or sub-task dependencies among others.

With regard to the acquisition of training and validation data, the data acquisition subsystem 208 can acquire and/or determine labeling data, also referred to herein as ground truth data. The ground truth data includes, for each piece or chunk of telemetry and task assignment data, corresponding operational states of the GPUs 106 and/or other processing resources of the fleet 202. Each piece or chunk of telemetry and task assignment data can be associated with a corresponding time interval or epoch. For each GPU 106 or processing resource, the corresponding operation state can be indicative of a failed state, a healthy state, a probability of failure of the GPU 106 or the processing resource and/or a time duration till failure of the GPU 106 or the processing resource. The training and validation data can include telemetry data, task assignment data and ground truth data. The training and validation data may include additional metadata, such as the date and time when each chunk of data was acquired among other metadata.

In some implementations, the data acquisition subsystem 208 can generate the ground truth data, such as probabilities of failure of the GPUs 106, using collected telemetry data of the GPUs 106. For instance, the data acquisition subsystem 208 can acquire or collect error reports or error messages that indicate potential GPU issues. The data acquisition subsystem 208 can generate the ground truth for GPU health using historical data where the outcomes, such as GPU failures, are known. The historical data helps to accurately label current GPU conditions. The data acquisition subsystem 208 can employ a directional attention-based long short-term memory (LSTM) neural network model. The data acquisition subsystem 208 can develop or build the directional attention-based LSTM neural network. The directional attention-based LSTM neural network can use captured historical error data, e.g., error data captured via XID error codes from the NVIDIA driver, to predict the likelihood of GPU failure within a defined time period, e.g., within the next 2 hours. The data acquisition subsystem 208 can determine failure probabilities based on prediction scores from the directional attention-based LSTM neural network. In some implementations, the data acquisition subsystem 208 can calculate the GPU failure probabilities using the error codes weighted by the prediction score from the LSTM network. This approach quantifies the immediate risk of failure, providing a nuanced understanding of GPU health.

The data acquisition subsystem 208 can store the acquired data in the database 220. When storing the data, the data acquisition subsystem 208 can associate each chunk of data with the corresponding ground truth data. The data acquisition subsystem 208 can designate a portion of the acquired data as training data to use for training the GAT model and another portion as validation data for validating the trained GAT model.

In some implementations, the data acquisition subsystem 208 can employ a distributed event streaming platform or a distributed log system, such as Apache Kafka, to stream the telemetry data and task assignment data from the GPUs 106 and/or other processing resources of the fleet 202. The data acquisition subsystem 208 can use monitoring tools to provide API endpoints that utilize the distributed log system for efficient, lossless, and fault-tolerant data aggregation. The data acquisition subsystem 208 can employ communication protocols to acquire data from the GPUs 106 or processing resources of the fleet 202. In some implementations, the communication protocols can include the transmission control protocol/Internet protocol (TCP/IP), the hypertext transfer protocol (HTTP), the simple mail transfer protocol (SMTP), the file transfer protocol (FTP), among other communication protocols. In some implementations, the data acquisition subsystem 208 or the resource management system 104 can employ lightweight binary protocols like protocol buffers or Avro to serialize data, ensuring faster transmission rates with reduced overhead.

The data processing subsystem 210 can use the training and validation data to extract feature vectors for one or more (e.g., each) of the GPUs 106 or processing resources of the fleet 202. For each piece of acquired data, the data processing subsystem 210 can determine a corresponding feature vector for at least one (e.g., each) GPU or processing resource involved in the tasks being handled when the piece of data was acquired. In extracting, computing or determining a feature vector based on a piece of data of a GPU 106 or a processing resource, the data processing subsystem 210 can determine or compute statistical features or statistical parameters of one or more parameters associated with the piece of data. For instance, the statistical features can include the mean, median, variance, standard deviation, cross-correlation and/or other statistical metrics of one or more telemetry parameters over a specific time window.

The data processing subsystem 210 can determine or compute temporal features or temporal parameters of one or more parameters associated with the piece of data. The temporal features or temporal parameters can include a rate of change or variation over time of one or more telemetry metrics or parameters. For instance, the rate of change or temporal variation can indicate sudden spikes in memory usage, core usage, power usage, processing unit temperature and/or temperature of a memory of the processing unit, e.g., GPU 106. Sudden spikes usually precede failures of the corresponding GPU 106 or the processing resource and can be reliable or good indicators or predictors of such failures.

In some implementations, the data processing subsystem 210 can use a fast Fourier transform (FFT) to compute or determine one or more frequency features of one or more telemetry parameters. The FFT algorithms enable capturing frequency-domain features of time-domain signals (or sequences of parameter values) of the GPUs 106 and/or other processing resources, which can indicate workload patterns and GPU (or processing resource) health.

In some implementations, the data processing subsystem 210 can employ data normalization techniques. For instance, the data processing subsystem 210 can leverage techniques like Z-score normalization or Min-Max scaling to ensure data uniformity. The use of normalization techniques can include the usage of vectorized operations for speed and efficiency, typically facilitated by frameworks like NumPy or TensorFlow.

The data processing subsystem 210 can determine or compute task-related features. The task-related features, for each GPU 106 or processing resource, can include the number of tasks assigned to the GPU 106 or processing resource, the types or categories of tasks assigned to the GPU 106 or processing resource, average memory usage per task, average core or computational resource usage per task, average power usage per task and/or other metrics that could indicate how heavily the GPU 106 or the processing resource is being utilized. The averaging can be performed over the time window or the data samples associated with the corresponding piece or chunk of data. For each GPU 106 or processing resource, a corresponding piece or chunk of data can include multiple data points or data samples of each parameter of a plurality of parameters acquired over a corresponding time window. The data processing subsystem 210 can compute or determine, for each piece or chunk of data associated with a corresponding GPU 106 and a corresponding time window, a respective feature vector.

In some implementations, the data acquisition subsystem 208 can acquire telemetry data and task assignment data on a periodic basis, e.g., every 10 seconds, every 20 seconds, every 30 seconds or according to some other time period. The data acquisition subsystem 208 can acquire streams of telemetry and task assignment data values associated with or corresponding to different timestamps. The data processing subsystem 210 can employ a sliding window over the acquired telemetry data and task assignment data to compute or determine feature vectors for various GPUs 106 or processing resources at each sliding window. The use of sliding window techniques, with possible overlaps, enables structuring data for the GNN 400 while emphasizing temporal dependencies and patterns.

The data acquisition subsystem 208 can associate each feature vector with the corresponding operational state of the respective GPU 104 or respective processing resource. In some implementations, the training data can be associated with different graphs representing different scenarios of task assignments, e.g., as depicted in FIG. 3. In other words, the training data can be associated with multiple time intervals, where within each time interval the tasks assigned to the GPUs 106 and/or other processing resources of the fleet 202 and/or the collaborations between the GPUs 106 and/or the other processing resources can be the same or non-changing throughout the interval. As such, each interval can be associated with a corresponding graph representing the collaborations between the GPUs 106 and/or the other processing resources of the fleet 202.

The D-GAT building subsystem 212 may construct, determine or define the graphs associated with the training data and validation data. For instance, given the acquired telemetry data and task assignment data associated with a given time interval, the D-GAT building subsystem 212 can identify or determine the GPUs 106 and/or other processing resources to which at least one task is assigned. The D-GAT building subsystem 212 can also determine or identify collaborating GPUs 106 and/or other processing resources of the fleet 202. Given the active GPUs 106 and/or other the processing resources of the fleet 202 as well as the collaborations between the GPUs 106 and/or other the processing resources, the D-GAT building subsystem 212 can construct, determine or define a corresponding graph. Each node in the graph can represent a corresponding GPU 106 or other processing resource of the fleet and each link between a pair of nodes can represent a collaboration between the pair of nodes. The collaboration means that the pair of nodes share at least one task.

The D-GAT building subsystem 212 can use the training data or the defined graphs to construct and/or initialize the GNN architecture 400 to be trained and validated. The D-GAT building subsystem 212 can determine type of neural network, the number of hidden layers and/or the number of nodes or neurons in each layer. The D-GAT building subsystem 212 may initialize the neural network parameters θ. The neural network parameters θ can include weights W and attention mechanism parameters a. The attention mechanism parameters a can be referred to herein as attention weight vector a. The D-GAT building subsystem 212 may determine, based on the acquired training data, whether the nodes of GAT model will have single-head attention or multi-head attention.

In a GAT with a multi-head attention mechanism, each "head" can be considered a separate, independent attention module that can learn to pay attention to different parts of the input data. The multi-head attention mechanism enables perspective diversity, increased model capacity and/or robustness in generalization. First, each head can learn a different set of attention weights. Because each head applies its own unique set of parameters to compute attention, each head can each focus on different features or parts of the input graph. This diversity allows the network to capture various aspects of the data simultaneously. Second, the use of multiple attention heads allows the GAT to effectively increase its learning capacity without significantly increasing computational complexity. Each head can be seen as a new pathway for information flow, providing a more complex and detailed representation of the relationships in the graph. Finally, having multiple sets of attention weights reduces the risk that the model becomes overly reliant on specific graph features that might not generalize well to unseen data. Instead, it averages or concatenates these diverse representations, leading to more robust predictions.

The multi-head attention mechanism can include feature transformation, attention calculation, feature aggregation and output combination. First, each head can transform the node features into a new space using its own trainable weight matrix. This transformation is similar to how different filters in a convolutional neural network can extract different features from an image. Second, for a given node, each head can compute attention coefficients that determine how much emphasis to put on each of its neighbors. These coefficients can be calculated independently in each head based on the transformed features, allowing each head to focus on different aspects of the node's relationships. After computing the attention coefficients, each head can aggregate the neighbor features accordingly. This step can be viewed as a weighted sum where the attention mechanism provides the weights. Finally, once each head has produced its output, these outputs can be combined. The output combination can be achieved using concatenation and/or averaging. When using concatenation, the outputs from various heads can be concatenated in intermediate layers. The concatenation allows the network to preserve and pass forward the diverse information captured by each head. When using averaging, the outputs from each head can be averaged in the final output layer. Averaging consolidates the information and produces a more unified and general representation, which is often useful for making final predictions or classifications.

The GAT training and validation subsystem 214 can train the GNN or GAT model constructed or initialized by the D-GAT building subsystem 212. Training the GAT model can include dynamically adjusting the GNN parameters θ, with a focus on refining attention weights and capturing nuanced dependencies among GPUs 106 and/or other processing resources based on their operational and task-related data. At each training iteration, the GAT training and validation subsystem 214 can feed the feature vectors for the GPUs 106 and/or other processing resources associated with a time instance as input to the GNN 400. The GAT training and validation subsystem 214 can use the feature vectors to update the attention coefficients of the corresponding graph and use the updated attention coefficients to update the feature vectors of the graph nodes. The output layer of the GNN 400 can generate or provide estimates of the operational states of the GPUs 106 or other processing resources based on the updated feature vectors. The GAT training and validation subsystem 214 can determine or compute the difference or error between the estimated operational states and the corresponding operational states in the ground truth data, and update the parameters θ of the GNN 400 in a way to minimize or decrease the discrepancy between the output of the GNN 400 and the corresponding ground truth data. The algorithm below depicts an example of a detailed process for training the GAT model.

The training data can include a set of training graphs {$G_1$, $G_2$, . . . , $G_n$}, where each graph $G_i$ includes nodes representing GPUs 106 or other processing resources and edges representing interactions therebetween. The training data is also labeled with GPU (and/or other processing resource) performance outcome. The performance outcomes can be indicative of operational or performance states of the GPUs 106 and/or other processing resources. The output of the GAT training and validation process is the trained (and validated) GAT model 216.

---

Algorithm:

1. Initialization:
   Initialize model parameters θ, including weights W and attention mechanism parameters a.
   Extract feature vectors for each GPU node from telemetry data and task metadata.

-continued

---

Algorithm:

---

2. Feature Extraction:
    Extract statistical, temporal, and task-related features for each node in $G_i$
3. For each epoch:
    For each graph $G_i$ in the training set:
    i. Graph Preparation
        1. Prepare $G_i$ by defining nodes and edges based on GPU telemetry and task
           metadata.
        2. Initialize node features based on extracted features.
    ii. Forward Pass with Attention
        1. Attention Coefficients Calculation:
           a. For each pair of nodes (i, j) connected by an edge, calculate the attention
             coefficient $\alpha_{ij}$ using the formula:

$$\alpha_{i,j} = \frac{\exp\left(\sigma_1\left(a^T[Wh_i \| Wh_j]\right)\right)}{\sum_{k \in N(i)} \exp\left(\sigma_1\left(a^T[Wh_i \| Wh_k]\right)\right)},$$

where ‖ denotes a concatenation operation, $h_i$ is the feature vector of node
             i, W is a weight matrix, a is a weight vector for the attention mechanism,
             N(i) denotes the neighbors of i and $\sigma_1(\cdot)$ is a nonlinear activation
             function.
        2. Feature Aggregation:
           a. Update the feature vector for each node i by aggregating features from its
             neighbors, weighted by the attention coefficients:

$$h_i' = \sigma_2\left(\sum_{j \in N(i)} \alpha_{i,j} Wh_j\right),$$

where $\sigma_2(\cdot)$ is a non-linear activation function, such as ReLU.
    iii. Loss Computation:
        1. Calculate the loss by comparing the model's output with the true labels for $G_i$
    iv. Backpropagation
        1. Update θ (W and a) by backpropagation using a gradient descent.
    v. Post-Processing
        1. Normalize attention weights across all edges.
        2. Optionally, prune edges with very low attention weights.
4. Validation:
    Evaluate the model on a validation set to monitor and prevent overfitting.
5. Final Model:
    After training, finalize the model parameters for predicting GPU failure.
6. Return: The trained GAT model.

---

When updating the attention coefficients $\alpha_{ij}$, the activation function $\sigma_1(\cdot)$ can be defined as the LeakyReLU function. Also, the division by the term $\Sigma_{k \in N(i)} \exp(\sigma_1(a^T[Wh_i\|Wh_k]))$ leads to a normalization of the attention coefficients $\alpha_{ij}$ such that the sum of attention coefficients associated with a node i is equal to 1. In other words, $\Sigma_{j \in N(i)} \alpha_{i,j}=1$.

The GAT model employs a self-attention mechanism to evaluate the significance of each edge or link between nodes representing GPUs 106 or other processing resources in the network. As depicted in the attention coefficients calculation step, the attention mechanism computes or determines the attention weight for the edge or link between a pair of nodes (i, j) using the feature vectors for the same nodes. For a node i, the corresponding weights $\alpha_{i,j}$ represent or indicate the relative importance or contribution of each neighboring node to the operational state of node i. The GAT model is configured to compute or determine the attention scores or coefficients $\alpha_{i,j}$ based on the similarity and relevance of the feature vectors between any two connected nodes representing a pair of collaborating GPUs 106 or processing resources. For example, if two GPUs 106 are frequently engaged in the same or related tasks, the attention mechanism might assign a higher attention weight to their connection, reflecting the operational dependency between them. During the training and validation process, the GAT training and validation subsystem 214 adjusts or updates the parameters governing the attention mechanism, such as the weight matrix W and the weight vector a to minimize or reduce prediction error. The iterative refinement process ensures that the attention weights evolve to highlight or reflect the most informative connections under various operational scenarios.

Beyond the telemetry data, the use of the task assignment data to train the GAT model provides a rich source for defining and updating the dependencies between the GPUs 106 and/or other processing resources of the fleet 202. The task-based dependencies help understand task allocation efficiency, resource sharing, and potential bottlenecks within the network of GPUs 106 processing resources. Based on the evolving task landscape and operational data, the GAT training and validation subsystem 214 or the GAT model may introduce new edges or modify existing ones to better represent the current state of interdependencies between the GPUs 106 and/or other resources. For instance, as the GAT training and validation subsystem 214 switches from one training graph $G_i$ to another training graph $G_{i+1}$, more nodes may be added. Also, as part of the post-processing step, the GAT training and validation subsystem 214 can prune edges with relatively very low attention weights leading to a decrease in the number of edges. The dynamic or iterative update of the attention coefficients can lead to changes in the graph topology, reflecting new insights into how GPUs 106 and/or other processing resources interact during different tasks.

In the feature aggregation step, the GAT training and validation subsystem 214 can update the feature vector of each node i as a weighted aggregation of feature vectors from neighboring nodes. The aggregated feature vectors from the neighboring nodes are weighted with corresponding attention coefficients $\alpha_{i,j}$. As such, feature vectors of neighboring nodes with relatively high attention coefficients $\alpha_{i,j}$ contribute more to the updated feature vector of the node i compared to feature vectors neighboring nodes with relatively low attention coefficients $\alpha_{i,j}$.

Referring back to FIG. 4, the GNN 400 or GAT model can include multiple hidden layers. For instance, the GAT model can include one or more hidden layers from computing or determining attention coefficients and one or more other hidden layers for performing the feature aggregation step.

In the case of multi-head attention, multiple updated feature vectors are computed or determined for each node. The GAT model can include multiple weight matrices $W_m$ and multiple weight vectors $a_m$, m=1, 2, . . . , M, associated with M attention heads. For each attention head, the corresponding attention coefficients can be determined or computed as $$\alpha_{i,j,m} = \frac{\exp\left(\sigma_1\left(a_m^T[w_m h_{m,i}\|w_m h_{m,j}]\right)\right)}{\sum_{k\in N(i)}\exp\left(\sigma_1\left(a_m^T[w_m h_{m,i}\|w_m h_{m,k}]\right)\right)}.$$

Also, the updated feature vectors corresponding to each attention head with index m can be determined or computed as $$h'_{m,i} = \sigma_2\left(\sum_{j\in N(i)} \alpha_{m,i,j}\ W_m h_{m,j}\right).$$

different types of workloads, different modes of operations of the GPUs 106 and/or other processing resources, To adjust or update the GAT parameters θ or $\theta_m$, e.g., the weight matrices $W_m$ and the weight vectors $a_m$, the GAT training and validation subsystem 214 can use gradient descent approach. As part of the post-processing step, the GAT training and validation subsystem 214 can normalize the weight vector a or weight vectors $a_m$ and/or prune edges associated with relatively small attention coefficients, e.g., below some defined threshold.

At step 4, the GAT training and validation subsystem 214 can validate the GAT model using a validation data set different from the training data set. During the validation, the GAT training and validation subsystem 214 can finetune the parameters θ, e.g., the weight matrix W and the weight vector a, in a similar way as the updating or adjustment of these parameters during training of the GAT model.

Incorporating the attention mechanism directly into the training algorithm enables highlighting or modeling how the GAT model dynamically focuses on relevant features and relationships between the GPUs 106 and/or other processing resources. This approach allows the GAT model to adapt to changing operational conditions, improving its predictive performance regarding GPU or other processing resource health and task efficiency.

The output of the training and validation process can be the trained GAT model 216, which can be deployed to monitor, estimate or predict performance outcomes, e.g., operational states, of the GPUs 106 and/or other processing resources. In particular, the trained GAT model 216 can receive feature vectors of various GPUs 106 and/or other processing resources as input and provide the corresponding performance outcomes as output.

Referring now to FIG. 5, a flowchart of a method 500 for managing a fleet of GPUs 106 and/or processing resources is shown, in accordance with some embodiments of the current disclosure. In brief overview, the method 500 can include obtaining GPU and/or other processing resource telemetry data and task assignment data (STEP 502) and generating a corresponding plurality of feature vectors (STEP 504). The method 500 can include determining, using the feature vectors and the trained GAT model 216, a performance or operational state of a node associated with the GAT model 216 (STEP 506) and determining an action to be taken to enhance performance of one or more GPUs 106 or processing resources or mitigate node failure (STEP 508).

The data acquisition subsystem 208 can acquire telemetry data and task assignment data of the GPUs 106 and/or other processing resources (STEP 502), e.g., as discussed above in relation with the training and validation process. The acquisition of the telemetry data and task assignment data can be performed in real-time or near real-time. The telemetry data can include real-time performance metrics from each GPU or other processing resource, such as temperature, power usage, core utilization, memory usage, and fan speed. The parameters of the acquired telemetry data can be similar to the parameters of the telemetry data collected for training and validation. The task assignment data can include information about the tasks being executed, including which GPUs 106 and/or other processing resources are involved, task duration, resource requirements and/or task dependencies. The parameters of the acquired task assignment data can be similar to the parameters of the task assignment data acquired for training and validation of the GAT model.

The method 500 can include the data processing subsystem 210 determining feature vectors for a plurality of nodes using the acquired telemetry data and task assignment data (STEP 504). For each node, the extracted features are similar to those extracted for training and validation. As discussed above, the features in each feature vector can include statistical features of the telemetry data, such as mean, median, variance and/or other statistical metrics of the telemetry data, over specific time windows. For instance, the data processing subsystem 210 can employ a sliding window over a stream or sequences of the telemetry data to compute corresponding statistical features. The extracted features can include temporal features such as rate of change or time variation of certain metrics, which can indicate sudden spikes in usage or temperature that might precede a node failure. The extracted features for a node can include task-related features, such as a number of assigned tasks, average resource usage per task and/or other task assignment metrics that could indicate how heavily a GPU or processing resources is utilized.

The method 500 can include the trained GAT model 216 determining, for at least one (e.g., each) node, a corresponding performance or operational state (STEP 506). The resource management system 204 can feed the real-time data into the GAT model 216 as feature vectors for the at least one node in the graph. The GAT model 216 can use the input feature vectors to determine or compute the attention coefficients between pairs of nodes as discussed above in relation to the training and validation process. The GAT model 216 can then compute or determine an updated feature vector for each node as discussed in relation with the feature aggregation step of the algorithm above. The attention coefficients at; and the updated feature vectors are determined or computed using the trained weight matrix W (or trained weight matrices $W_m$) and the trained weight vector a (or weight vectors $a_m$).

The trained GAT model 216 can determine or compute the operational or performance state of the at least one node using the updated feature vectors of the nodes. For instance, the output layer of the GAT model 216 can include nodes or neurons associated with a corresponding activation function. The output layer can determine, for the at least one node, a respective current operational state based on one or more corresponding updated feature vectors of the node. The operational state of the node can include a probability of failure of the node give the updated feature vector(s) or a probability of node failure within a predefined future time duration.

The method 500 can include the action subsystem 218 determining the action to be taken to enhance performance of one or more GPUs 106 and/or other processing resources (STEP 508). The action subsystem 218 can employ a lookup table, a logic diagram or another neural network to determine the action based on one or more operational states of one or more nodes. The output of the GAT model 216 provides predictive insights into the potential failure rates of GPUs and/or other processing resources within a data center ecosystem or other ecosystem.

The action subsystem 218 can predict, based on the performance state of a node, a future failure of the node and determine the action to be taken based on the predicted future failure of the node. For instance, the action subsystem 218 can predict the node failure based on the probability of failure of the node exceeding some defined probability threshold. The action subsystem 218 can determine the action to be taken based on or responsive to the predicted failure of the node.

In some implementations, the action to be taken can include determining, based on the performance state of the node, one or more nodes to which to assign a new task. For instance, if a node has a relatively high failure probability, e.g., greater than a given threshold, the action subsystem 218 determines not to allocate more tasks to the node and can proactively allocate new tasks to GPUs 104 and/or other processing resources with lower risk profiles or lower failure probabilities. In particular, if the GAT model 216 predicts a high probability of failure for certain GPUs 106 and/or other processing resources, critical tasks or tasks with a high computational load can be diverted to GPUs 106 and/or other processing resources with lower failure probabilities.

In some implementations, the action to be taken can include the action subsystem 218 determining, based on the performance state of the node, to transfer a workload of the node to another node of the plurality of nodes. In response to the outputs of the GAT model 216, e.g., operational states of the GPUs 106 and/or other processing resources, the action subsystem 218 can dynamically reallocate resources or reassign one or more tasks. For instance, if a GPU 106 is predicted to have an increased or a relatively high failure probability, the action subsystem 218 might preemptively transfer some or all of the workload of the GPU to a standby GPU or to one or more other GPUs 106 to minimize or reduce the risk of service disruption.

In some implementations, the action to be taken can include the action subsystem 218 determining, based on the performance state of the node, a scheduling of maintenance activities for at least one GPU and/or other processing resource of the fleet 202. The output of the GAT model 216 can guide the scheduling of maintenance activities by identifying GPUs 106 and/or other processing resources that are likely to fail. Maintenance can be performed during off-peak hours for such processing units, thus reducing the impact on operations and extending the lifespan of the hardware.

In some implementations, the action to be taken can be an action to enhance fault tolerance. For instance, the action subsystem 218 can determine, discern, or analyze patterns of predicted node failures. The action subsystem 106 can design or determine, based on the failure patterns, one or more redundant systems that can take over when a high-risk GPU 106 or some other processing resource fails. The redundant system(s) can help maintain the integrity of the data center's services.

In some implementations, the output of the GAT model 216 can allow for smarter load-balancing strategies. Workloads can be distributed across GPUs 106 and/or some other processing resources in a manner that balances the current load and anticipates future state changes, ensuring that no single GPU 106 or other processing resource is overburdened as its risk of failure increases. The action subsystem 218 can determine, based on the performance state of one or more nodes, a load balancing approach for distributing workloads among the plurality of nodes.

In some implementations, attention-based predictions made by the GAT model 216 can inform cooling and power supply systems. GPUs 106 and/or other processing resources that are under heavy load and are at risk could have cooling systems adjusted to mitigate the risk of overheating and failure. The action subsystem 218 can determine, based on the performance state(s) of one or more nodes, to adjust a parameter of a cooling system associated with the one or more nodes. The action subsystem 218 can determine, based on the performance state(s) of one or more nodes, to adjust a parameter of a power system associated with the one or more nodes.

In some implementations, the resource management system 204 can establish a continuous learning loop where GAT model parameters θ or $θ_m$ are updated with new data on GPU or processing resource performance and task outcomes. The loop allows the GAT model 216 to refine its predictions and mitigation strategies, increasing reliability.

In some implementations, the GAT model outputs can be integral to disaster recovery planning, ensuring backups are ready for deployment if high-risk components fail, and maintaining business continuity with minimal downtime. The action subsystem 218 can use patterns of predicted node failures to design or determine a disaster recovery plan.

By incorporating the GAT model's predictive capabilities, data centers can transition from a reactive stance to a proactive one, enhancing operational efficiency, reliability, and service quality while reducing potential downtime and maintenance costs.

In some implementations, the action subsystem can provide or send the action to be taken and/or one or more operational state of one or more GPUs 106 and/or other processing resources to the computing device 206 for display, e.g., via the UI 222.

Example Computing Device

Figure 6:
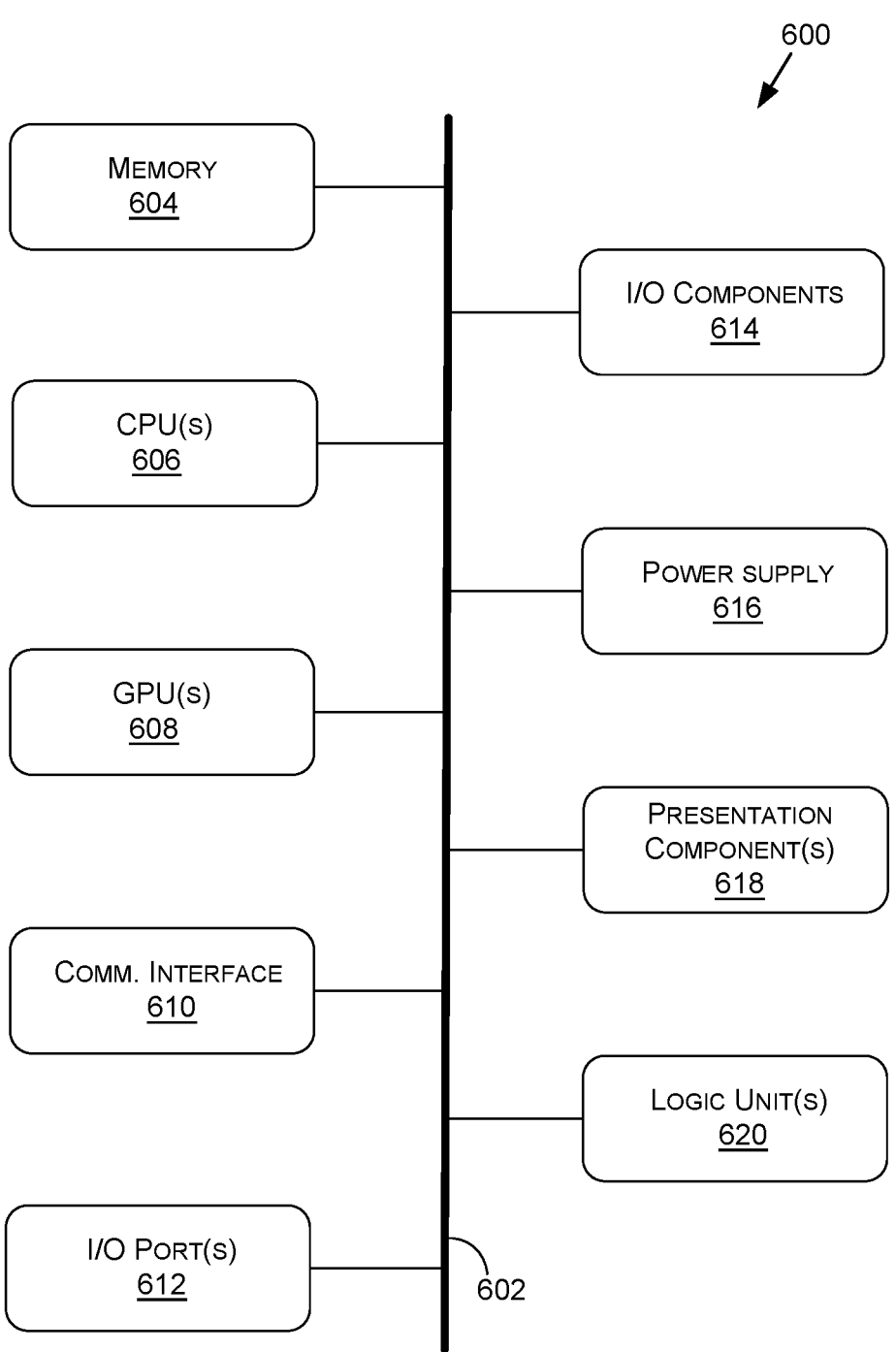
FIG. 6 shows a block diagram of an example computing device(s) suitable for use in implementing some embodiments of the present disclosure.

FIG. 6 is a block diagram of an example computing device(s) 6suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620.

In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
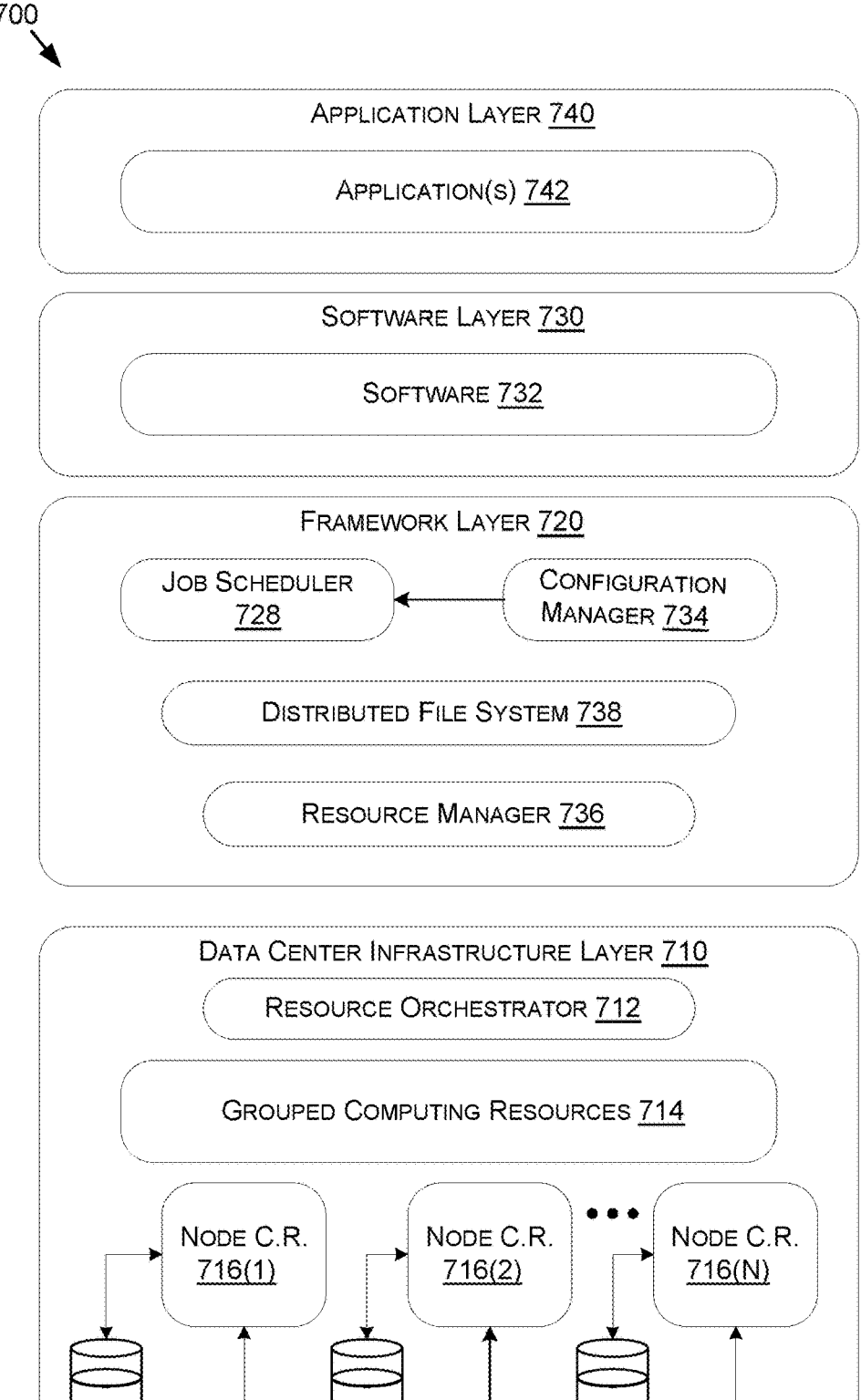
FIG. 7 shows an example data center that may be used in at least one embodiment of the present disclosure.

FIG. 7 illustrates an example data center 700 that may be used in at least one embodiment of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 728, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 728 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 728. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a work-station, an edge device, any combination of these delineated devices, or any other suitable device.

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, generative AI, operations using one or more large language models (LLMs) or one or more vision language models (VLMs), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing generative AI operations; systems for performing operations using one or more LLMs or VLMs, systems for performing light transport simulation, systems for performing collaborative content creation for 3D assets, systems implemented at least partially using cloud computing resources, and/or other types of systems.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:
1. A system, comprising:
  a memory and one or more processing units to perform operations to:

obtain, from a plurality of graphics processing units (GPUs) executing a plurality of tasks, GPU telemetry data and task assignment data, the task assignment data indicative, for at least one task of the plurality of tasks, of one or more respective GPUs executing the at least one task;

generate, using the GPU telemetry data and the task assignment data, a plurality of feature vectors;

determine, using a graph attention network (GAT) comprising a plurality of nodes and based at least on the plurality of feature vectors, the GPU telemetry data, and at least one association between two or more nodes of the plurality of nodes executing at least one common GPU task, a performance state of at least one node of a plurality of nodes, wherein determining the performance state comprises dynamically updating at least one attention weight of the GAT between two or more nodes based at least on the task assignment data, wherein the GAT comprises the plurality of nodes and based at least on the plurality of feature vectors, the GPU telemetry data, and at least one association between the two or more nodes of the plurality of nodes executing at least one common GPU task; and determine, based on the performance state of the at least one node, an action to be taken to enhance performance of the plurality of GPUs or mitigate node failures.

2. The system of claim 1, wherein the GPU telemetry data includes real-time performance metrics of the plurality of GPUs.

3. The system of claim 1, wherein the GPU telemetry data includes, for at least one GPU of the plurality of GPUs, performance metrics indicative of at least one of:

a temperature of the at least one GPU, a temperature of a memory of the at least one GPU, a GPU power usage, a core utilization, a GPU memory usage, or a speed of a fan of the at least one GPU.

4. The system of claim 1, wherein the task assignment data includes, for each task, at least one of:

a task duration, task dependencies, or resource requirements.

5. The system of claim 1, wherein to generate the plurality of feature vectors, the one or more processing units perform operations to determine at least one of:

statistical features of the GPU telemetry data over a time window, temporal features of the GPU telemetry data, or frequency-domain features of the GPU telemetry data.

6. The system of claim 1, wherein the one or more processing units perform operations to:

predict, based on the performance state of the at least one node, a future failure of the at least one node; and determine the action to be taken based on the predicted future failure of the at least one node.

7. The system of claim 1, wherein the one or more processing units perform operations to:

determine, based on the performance state of the at least one node, one or more other nodes from the plurality of nodes to which to assign a new task.

8. The system of claim 1, wherein the one or more processing units perform operations to:

determine, based on the performance state of the at least one node, to transfer a workload of the at least one node to another at least one node of the plurality of nodes.

9. The system of claim 1, wherein the one or more processing units perform operations to:

determine, based on the performance state of the at least one node, a scheduling of maintenance activities for at least one GPU of the at least one node.

10. The system of claim 1, wherein the one or more processing units perform operations to:

determine, based on the performance state of the at least one node, a load balancing approach for distributing workloads among the plurality of nodes.

11. The system of claim 1, wherein the one or more processing units perform operations to:

determine, based on the performance state of the at least one node, to adjust a parameter of at least one:

a cooling system associated with the at least one node; or a power system associated with the at least one node.

12. The system of claim 1, wherein the one or more processing units perform operations to:

determine one or more failure patterns based on predicted failures of one or more nodes of the plurality of nodes; and determine, based on the one or more failure patterns, a design of a redundant system configured to take over workload from at least a subset of nodes from the one or more nodes corresponding to predicted failures.

13. The system of claim 1, wherein a machine learning model employs the GAT, and wherein the machine learning model is implemented over one or more other GPUs different from the plurality of GPUs.

14. The system of claim 1, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a system for performing generative AI operations;

a system for performing one or more operations using a large language model (LLM);

a system for performing one or more operations using a vision language model (VLM);

a collaborative content creation platform for 3D assets; or a system implemented at least partially using cloud computing resources.

15. A method comprising:

obtaining, from a plurality of graphics processing units (GPUs) executing a plurality of tasks, GPU telemetry data and task assignment data, the task assignment data indicative, for at least one task, one or more respective GPUs executing the at least one task;

generating, using the GPU telemetry data and the task assignment data, a plurality of feature vectors;

determining, using a graph attention network (GAT) comprising a plurality of nodes and based at least on the plurality of feature vectors, the GPU telemetry data, and at least one association between two or more nodes of the plurality of nodes executing at least one common GPU task, a performance state of at least one node of a plurality of nodes, wherein determining the performance state comprises dynamically updating at least one attention weight of the GAT between two or more nodes based at least on the task assignment data, wherein the GAT comprises the plurality of nodes and based at least on the plurality of feature vectors, the GPU telemetry data, and at least one association between the two or more nodes of the plurality of nodes executing at least one common GPU task; and determining, based on the performance state of the wherein the at least one node, an action to be taken to enhance performance of the plurality of GPUs or mitigate node failures.

16. The method of claim 15, wherein the GPU telemetry data includes, for wherein at least one GPU of the one or more plurality of GPUs, performance metrics indicative of at least one of:

one or more real-time performance metrics of the at least one GPU;

a temperature of the at least one GPU;

a temperature of a memory of the at least one GPU;

a GPU power usage;

a core utilization;

a GPU memory usage; or a speed of a fan of the at least one GPU.

17. The method of claim 15, wherein the task assignment data includes, for at least one task, at least one of:

a task duration;

task dependencies; or resource requirements.

18. The method of claim 15, wherein generating the plurality of feature vectors includes determining at least one of:

statistical features of the GPU telemetry data over a time window;

temporal features of the GPU telemetry data; or frequency-domain features of the GPU telemetry data.

19. The method of claim 15, wherein determining an action to be taken comprises at least one of:

predicting based on the performance state of the at least one node, a future failure of the at least one node, and determining the action to be taken based on the predicted future failure of the at least one node;

determining, based on the performance state of the at least one node, one or more other nodes of the plurality of nodes to which to assign a new task;

determining, based on the performance state of the at least one node, to transfer a workload of the at least one node to another node of the plurality of nodes;

determining, based on the performance state of the at least one node, a scheduling of maintenance activities for at least one GPU of the at least one node;

determining, based on the performance state of the at least one node, a load balancing approach for distributing workloads among the plurality of nodes;

determining, based on the performance state of the at least one node, to adjust a parameter of a cooling system associated with the at least one node;

determining, based on the performance state of the at least one node, to adjust a parameter of a power system associated with the at least one node; or determining one or more failure patterns based on predicted failures of one or more nodes of the plurality of nodes, and determining, based on the one or more failure patterns, a design of a redundant system configured to take over workload from the one or more nodes of the plurality of nodes associated with the predicted failures.

20. An application programming interface (API) to interface with an application executed using one or more processors, the API to cause the one or more processors to:

obtain, from a plurality of graphics processing units (GPUs) executing a plurality of tasks, GPU telemetry data and task assignment data, the task assignment data indicative, for at least one task of the plurality of tasks, of one or more respective GPUs executing the at least one task;

generate, using the GPU telemetry data and the task assignment data, a plurality of feature vectors;

determine, using a graph attention network (GAT) comprising a plurality of nodes and based at least on the plurality of feature vectors, the GPU telemetry data, and at least one association between two or more nodes of the plurality of nodes executing at least one common GPU task, a performance state of at least one node of a plurality of nodes, wherein determining the performance state comprises dynamically updating at least one attention weight of the GAT between two or more nodes based at least on the task assignment data, wherein the GAT comprises the plurality of nodes and based at least on the plurality of feature vectors, the GPU telemetry data, and at least one association between the two or more nodes of the plurality of nodes executing at least one common GPU task; and determine, based on the performance state of the at least one node, an action to be taken to enhance performance of the plurality of GPUs or mitigate node failures.

* * * * *